United States Patent
Ito et al.

(10) Patent No.: US 10,436,674 B2
(45) Date of Patent: *Oct. 8, 2019

(54) DEVICE FOR ESTIMATING SERVICE LIFE AND METHOD FOR ESTIMATING SERVICE LIFE OF ROLLING BEARING

(71) Applicant: NTN CORPORATION, Osaka (JP)

(72) Inventors: Takashi Ito, Kuwana (JP); Takumi Fujita, Kuwana (JP)

(73) Assignee: NTN CORPORATION, Osaka (JP)

( * ) Notice: Subject to any disclaimer, the term of this patent is extended or adjusted under 35 U.S.C. 154(b) by 632 days.

This patent is subject to a terminal disclaimer.

(21) Appl. No.: 14/413,831

(22) PCT Filed: Jul. 4, 2013

(86) PCT No.: PCT/JP2013/068428
§ 371 (c)(1),
(2) Date: Jan. 9, 2015

(87) PCT Pub. No.: WO2014/010514
PCT Pub. Date: Jan. 16, 2014

(65) Prior Publication Data
US 2015/0168254 A1    Jun. 18, 2015

(30) Foreign Application Priority Data
Jul. 12, 2012   (JP) .................................. 2012-156113

(51) Int. Cl.
G01M 13/00    (2019.01)
G01M 13/04    (2019.01)

(52) U.S. Cl.
CPC .................. *G01M 13/04* (2013.01)

(58) Field of Classification Search
CPC ........................... G01M 13/04; G01M 13/045
See application file for complete search history.

(56) References Cited

U.S. PATENT DOCUMENTS

| | | |
|---|---|---|
| 5,336,338 A | 8/1994 | Toda |
| 7,559,240 B2 | 7/2009 | Iwatsubo et al. |

(Continued)

FOREIGN PATENT DOCUMENTS

| | | |
|---|---|---|
| CN | 1659427 | 8/2005 |
| CN | 1934433 A | 3/2007 |

(Continued)

OTHER PUBLICATIONS

Office Action dated Jul. 8, 2015 in Chinese Patent Application No. 201280005705.1 (corresponding to copending U.S. Appl. No. 13/979,784).

(Continued)

*Primary Examiner* — Mischita L Henson (57) ABSTRACT

The lifetime estimation device for a rolling bearing includes a buildup height estimation unit operable for estimating the buildup height of the indentation from a rolling surface from the depth of an indentation or the indentation size in accordance with a predetermined rule; and a lifetime estimation unit for estimating the service life of the rolling bearing in accordance with a rule stipulated according to the relationship between the estimated buildup height of the indentation and the rate of reduction of the rolling fatigue life and a dynamic equivalent load. The lifetime estimation unit calculates the service life of the rolling bearing corresponding to the contact surface pressure.

11 Claims, 7 Drawing Sheets

(56) References Cited

U.S. PATENT DOCUMENTS

| | | | |
|---|---|---|---|
| 7,577,555 | B2 | 8/2009 | Umeda et al. |
| 7,813,906 | B2 | 10/2010 | Shiromaru et al. |
| 9,329,100 | B2* | 5/2016 | Ito .................. G01M 13/04 |
| 2004/0249619 | A1 | 12/2004 | Urakami et al. |
| 2005/0246150 | A1 | 11/2005 | Shiromaru et al. |
| 2007/0277613 | A1 | 12/2007 | Iwatsubo et al. |
| 2012/0109539 | A1 | 5/2012 | Hasegawa et al. |
| 2013/0298704 | A1 | 11/2013 | Ito et al. |

FOREIGN PATENT DOCUMENTS

| | | |
|---|---|---|
| CN | 103328947 A | 9/2013 |
| JP | 5-187965 | 7/1993 |
| JP | 5-271779 | 10/1993 |
| JP | 2003-121304 | 4/2003 |
| JP | 2004-3891 | 1/2004 |
| JP | 2005-134117 | 5/2005 |
| JP | 2005-140648 | 6/2005 |
| JP | 3842005 | 11/2006 |
| JP | 3880455 | 2/2007 |
| JP | 2009-229288 | 10/2009 |
| JP | 4504065 | 7/2010 |
| JP | 2012-149892 | 8/2012 |
| WO | WO 2012/098979 A1 | 7/2012 |

OTHER PUBLICATIONS

Chinese Office Action dated Jan. 28, 2015 in Chinese Patent Application No. 201280005705.1.

PCT International Preliminary Report on Patentability dated Jan. 22, 2015 in corresponding International Patent Application No. PCT/JP2013/068428.

Tsushima et al., "Application of X-Ray Measurement to Bearing Failure Analysis", *Bearing Engineer*, 1984, pp. 25-34, No. 49.

Okamoto et al., "Determination of Index in Lifetime Formula", Chapter 4 of *Dynamic Load Capacities of Rolling Bearings and Roller Bearings—Detailed Minutes on the Theory of Lundberg-Palmgren, Lectures on Mechanical Elements at Chiba University, Department of Mechanical Engineering, Faculty of Engineering,* 1988, pp. 35-36.

Toda et al., "Effect of Dent on Rolling Fatigue Life", *Journal of Japanese Society of Tribologists*, Jun. 15, 1993, pp. 48-54, vol. 38, No. 6.

Sada et al., "Lifetime Reduction of Ball Bearings caused by Indentation", Proceedings of *Spring Meeting of the Japan Society of Precision Engineering*, Mar. 5, 2003, pp. 589.

Akamatsu et al., "Effect of Indentation Size and Load on Abrasion Lifetime of Indentation Originated Type", Proceedings of *JAST Tribology Conference Tottori Nov. 2004*, Oct. 20, 2004, pp. 525-526.

International Search Report dated Aug. 6, 2013, in corresponding International Patent Application No. PCT/JP2013/068428.

U.S. Appl. No. 13/979,784, filed Jul. 15, 2013, Ito et al., NTN Corporation.

Indonesian Substantive Examination Report Stage I dated Apr. 17, 2017 in corresponding Indonesian Patent Application No. P00201500433.

U.S. Notice of Allowance dated Jan. 14, 2016 in U.S. Appl. No. 13/979,784.

Japanese Office Action dated Mar. 8, 2016 in corresponding Japanese Patent Application No. 2012-156113.

Extended European Search Report dated Feb. 29, 2016 in corresponding European Patent Application No. 13816454.6.

U.S. Office Action dated Sep. 9, 2015 in co-pending U.S. Appl. No. 13/979,784.

Australian Office Action dated Sep. 2, 2016 in corresponding Australian Patent Application No. 2013287853.

Chinese Office Action dated Jun. 27, 2016 in corresponding Chinese Patent Application No. 201380036689.7.

European Invitation pursuant to Article 94(3) and Rule 71(1) EPC dated Jul. 13, 2017 in related European Application No. 13 816 454.6.

First Examination Report dated Sep. 27, 2018 in corresponding Indian Patent Application No. 680/DELNP/2015.

\* cited by examiner

DEVICE FOR ESTIMATING SERVICE LIFE AND METHOD FOR ESTIMATING SERVICE LIFE OF ROLLING BEARING

CROSS REFERENCE TO THE RELATED APPLICATION

This application is a U.S. National Stage Application, which claims the benefit under 35 U.S.C. § 371, of PCT International Patent Application No. PCT/JP2013/068428, filed Jul. 4, 2013, which is based on and claims the foreign priority benefit under 35 U.S.C. § 119, of Japanese Patent Application No. 2012-156113, filed Jul. 12, 2012, the entire disclosures of which are herein incorporated by reference as a part of this application.

BACKGROUND OF THE INVENTION

Field of the Invention

The present invention relates to a device for and a method of estimating the service life of a rolling bearing and particularly to a technique that are used for decision over possibility of the reuse of the bearing used in, for example, construction machinery.

Description of Related Art

It has long been known that the lifetime of the rolling bearing depends on various conditions such as including, for example, a working load, a lubricating condition, and materials used to form the rolling bearing. The assessment of the lifetime of the bearing has hitherto been carried out by the utilization of a mathematic calculation life formula that is formulated with due consideration paid to such conditions as, for example, the working load, information condition, and the materials used (See the non-patent document 1 listed below.). This mathematic life calculation formula is currently used to estimate the period during which the rolling bearing can be used in service when used under a certain condition, or to estimate the condition under which the rolling bearing can be used without being accompanied by fracture during the required period of service. The rolling bearing is generally used in service under the service condition that is stipulated according to the life formula and, accordingly, no problem ought to occur so long as the bearing is used in service under the ordinary service condition.

It has however been found that the lifetime of the rolling bearing is often of a controversial matter in the market. This appears to be because the rolling bearing actually used is used in service under a condition different from the design condition and/or foreign matters admixed in a lubricating agent brings about an impairment such as, for example, an indentation or the like to a bearing surface layer. For these reasons, some methods have been suggested to estimate the remaining lifetime of the rolling bearing in service. Those remaining lifetime estimation methods hitherto suggested in the art include, inter alia, an off-line method of a kind, in which a change in material of one of rolling bearing assemblies in service that has been sampled out is examined to assess the timing of replacement of the whole bearing assemblies such as discussed in the non-patent document 2 listed below, and an on-line method of a kind in which the conditions of use of the individual bearing assemblies are examined at the site of use thereof to assess the timing of replacement of the individual bearing assemblies such as discussed in any one of the patent documents 1 to 3 listed below.

As one of on-line remaining lifetime estimation methods, a method has been suggested in which the load on the bearing in service, the number of rotations thereof, the condition of a lubricant oil and the size of an indentation formed by the foreign matter are estimated from values given out by various sensors so that the remaining lifetime of such bearing may be estimated such as disclosed in the patent document 3 listed below. According to this method, the relationship between the indentation size and the lifetime of the rolling bearing is expressed by the following formula.

$$L_{10}=L_{10c}\times 10^{(0.0038d\ log(P/C)-0.272\ log(d)+0.416)} \qquad (1)$$

in which $L_{10}$ represents 10% lifetime (h), $L_{10c}$ represents the calculated lifetime (h), d represents the diameter of the indentation (μm), P represents the load (kgf), and C represents the dynamic load rating (kgf).

PATENT DOCUMENTS

Patent Document 1 Japanese Patent No. 3880455
Patent Document 2 Japanese Patent No. 3842055
Patent Document 3 Japanese Patent No. 4504065

NON-PATENT DOCUMENTS

Non-patent Document 1: Junzo Okamoto; "Korogari Jikuuke•Doteki Fukayouryo—Lundberg-Palmgren Riron no Shokai—"Dai 4-sho Jumyo-shiki ni okeru Shisu no Kettei (Detailed Minutes on the Lundberg-Palmgren Theory—'Chapter 4: Determination of Index in Lifetime Formula', Lectures on Mechanical Elements)", Department of Mechanical Engineering, Faculty of Engineering of Chiba University, (1988) pp. 35-36

Non-patent Document 2: Noriyuki Tsushima, Hirokazu Nakashima and Kikuo Maeda; "X-sen Oryoku-sokutei no Jikuuke Hasonn Kaiseki heno Oyo (Application of X-ray Measurement to Bearing Failure Analysis)", Bearing Engineer, No. 49 (1984) pp. 25-34

Non-patent Document 3: Kazutoshi Toda, Tsuyoshi Mikami and Teruo Hosino; "Bisho Atsukonn no Korogari Jumyo ni oyobosu Eikyo (Effect of Dent on Rolling Fatigue Life)", Tribologist, Vol. 38, No. 6 (1993) pp. 526-532

SUMMARY OF THE INVENTION

The formula (1) referred to above appears to indicate that the indentation size and the load are determinative of the lifetime of the rolling bearing. It has, however, been found that considering that the lifetime of the rolling bearing having an indentation formed therein is determined by the height of a buildup developed in the vicinity of the indentation (as discussed in the non-patent document 3 listed above), the relationship between the indentation size and the height of the buildup referred to above may not be uniquely fixed particularly where shapes of the foreign matters attributable to formation of the indentation are not uniform. Because of this, the lifetime of the rolling bearing cannot be accurately estimated solely by the indentation size. Also, the lifetime of the rolling bearing when the indentation is formed therein varies depending on the number of indentations and the surface area occupied by the indentation or indentations and, therefore, the lifetime of the rolling bearing cannot be accurately estimated solely by the indentation size.

As discussed above, not only the indentation size, but also the height of the buildup in the vicinity of the indentation, the number of indentations developed, the surface area occupied by the indentation or indentations and the load imposed on the rolling bearing in service are all determinative of the lifetime of the rolling bearing when the indentation is so formed, but no method of estimating the lifetime of the rolling bearing in which those factors are taken into consideration has yet been made available.

In view of the foregoing, the present invention has for its primary object to provide a device for and a method of estimating the lifetime of the rolling bearing, in which the lifetime of the rolling bearing when an indentation is formed therein can be accurately estimated with due consideration paid to the height of the buildup in the vicinity of the indentation and other factors.

The lifetime estimation device in accordance with the present invention is a lifetime estimation device for estimating the lifetime of a rolling bearing including inner and outer rings 10 and 11, each ring having a respective rolling surface 10a and 11a defined therein, and a plurality of rolling elements 12 rollingly interposed between the respective rolling surfaces 10a and 11a of the inner and outer rings 10 and 11. The lifetime estimation device of the kind referred to above includes a buildup height estimation unit 7 to receive an input indicating depth h2 of an indentation 14, which is formed in one of the rolling surfaces 10a and 11a of the inner and outer rings 10 and 11, or a size D1 of the indentation 14 that represents a planar size so as to estimate, in accordance with a predetermined rule, the height of a buildup of the indentation 14 as measured from the rolling surface 10a or 11a where such indentation 14 has been formed based on the inputted depth of the indentation or the indentation size, and a lifetime estimation unit 8 for estimating the lifetime of the rolling bearing in accordance with the rule determined by a relationship between the estimated buildup height of the indentation and the rate of reduction in a rolling fatigue life and a dynamic equivalent load, in which the lifetime estimation unit calculates the service life $L_n$ of the rolling bearing according to the following equation.

It is to be noted that the planar indentation size 14 referred to above is intended to mean the length such as, for example, the diametrical dimension of or the surface area of the indentation as viewed in a plane and is, for example, represented by the maximum diametrical dimension of the indentation 14 if the indentation 14 when viewed in a plane is of a round shape, or, represented by a value, which is twice the distance from a substantially center portion of the indentation 14 to the maximum outer peripheral edge thereof, if the indentation 14 when viewed in a plane is of a non-round shape.

$$L_n = a_d a_1 \left(\frac{C}{P}\right)^p$$

in which $a_d = c \cdot e^{(-b \times h)}$; $a_1 = \{[\ln(1-0.01n)]/\ln 0.9\}^{1/e}$; the parameter n is identical with n of the following service life $L_n$; $L_n$ represents n % service life; $a_d$ represents an indentation correction coefficient; b and c represent respective constants; h represents the buildup height (μm) of the indentation; $a_1$ and $a'_1$ each represent the reliability coefficient; P represents the load (kgf); C represents the dynamic rated load (kgf); p represents the load service life exponent (p=3 in the case of a ball bearing or p=10/3 in the case of a roller bearing), and e represents the Weibull slope (e=10/9 in the case of a ball bearing or e=9/8 in the case of a roller bearing), noting that e=1.5 when at 10% or smaller service life.

It has been known in the art that the lifetime of the rolling bearing can be estimated from the dynamic equivalent load. On the other hand, the lifetime of the rolling bearing under a condition that the foreign matter may admix in the bearing is shorter than the estimated lifetime because of the stress concentration occurring in a buildup portion in the vicinity of the indentation brought about by the foreign matter. Because of it, the need has been recognized to correct the lifetime of the rolling bearing when the indentation 14 is formed in at least one of the respective rolling surfaces 10a and 11a of the inner and outer rings 10 and 11. Also, in the bearing actually used, it is difficult to directly measure the buildup height h1 of the indentation 14 at the initial stage of formation of the indentation. This is because the buildup height h1 of the indentation 14 tends to be reduced as a result of the plastic deformation during the rolling. Accordingly, where the lifetime of the bearing is to be estimated, it is necessary to estimate the buildup height h1 of the initial indentation 14 formed in the bearing actually used.

The applicant of the present invention has conducted extensive studies to determine the relationship between the depth h2 of the indentation 14 and the buildup height h1 of the indentation 14 and the relationship between the indentation size and the buildup height h1 of the indentation 14 while indentations 14 of different shapes had been formed in the raceway surfaces 10 and 11. As a result, it has been found that the buildup height h1 of the indentation 14 has a propensity of increasing linearly with increase of the depth h2 of the indentation 14 and such propensity does not change in dependence with the shape of the indentation. This has provides an indication that the buildup height h1 of the indentation 14 can be primarily estimated from the depth h2 of the indentation 14. On the other hand, with respect to the relationship between the indentation size and the buildup height 1 of the indentation 14, it has been found that although a linear relationship similar to the relationship between the depth h2 of the indentation 14 and the buildup height h1 of the indentation 14 has been found, such linear relationship varies depending on change in shape of the indentation. The buildup height estimation unit 7 employed in this construction estimates the buildup height h1 of the indentation 14, as measured from the rolling surfaces 10a and 11a, from the depth h2 of the indentation 14, formed in the rolling surfaces 10a and 11a, or the indentation size in accordance with the predetermined rule.

Also from the result of tests conducted, the buildup height h1 of the indentation 14 and the lifetime of the rolling bearing are assumed to have a certain relationship therebetween and the lifetime estimation unit 8 estimates the lifetime of the rolling bearing from the relationship between the buildup height h1 of the indentation, estimated by the buildup height estimation unit 7, and the rate of reduction of the rolling fatigue life and the dynamic equivalent load. Specifically, the lifetime estimation unit 8 utilizes the above mentioned equation to calculate the service life $L_n$ of the rolling bearing. Also, based on the result of the experiments referred to above, the value of the indentation correction coefficient in the foregoing equation is expressed by the threshold value which varies in dependence on, for example a load condition. Accordingly, the lifetime of the rolling bearing when the indentation 14 is formed in the rolling surfaces 10a and 11a can be accurately estimated.

The lifetime estimation unit 8 may be of a type capable of calculating the service life $L_n$ of the rolling bearing using the following equation. In this case, the further highly accurate estimated service life can be determined.

$$L_n = a_d a'_1 \left(\frac{C}{P}\right)^p$$

in which $a_d = c \cdot e^{(-b \times h)}$; $a'_1 = \{0.95 \ [\ln(1-0.01n)/\ln \ 0.9]^{1/e} + 0.05\}$; the parameter n is identical with n of the following service life $L_n$. In the formula (3) above, $L_n$ represents n % service life, $a_d$ represents an indentation correction coefficient, b and c represent respective constants, h represents the buildup height (μm) of the indentation, $a'_1$ represents the reliability coefficient, P represents the load (kgf), C represents the dynamic rated load (kgf), p represents the load service life exponent (p=3 in the case of a ball bearing or p=10/3 in the case of a roller bearing), and e represents the Weibull slope (e=10/9 in the case of a ball bearing or e=9/8 in the case of a roller bearing), noting that e=1.5 when at 10% or smaller service life.

The buildup height estimation unit 7 referred to above may include a storage section 7a for storing the relationship between the indentation size and the buildup height h1 of the indentation 14 under particular conditions of use of the bearing and a calculation section 7b for calculating the buildup height h1 of the indentation 14 by comparing the inputted buildup size with the relationship stored in the storage section 7a. The relationship between the indentation size and the buildup height h1 of the indentation 14 changed depending on the shape of the indentation 14 and/or the rolling condition, that is, the particular condition of use of the bearing. Accordingly, the relationship between the indentation size under the particular condition of use of the bearing and the buildup height h1 of the indentation 14 is stored in the storage section 7a and the buildup height h1 of the indentation 14 can be calculated by causing the calculation section 7b to compare the inputted indentation size with the relationship stored in the storage section 7a.

The lifetime estimation unit referred to above may include a lifetime calculation section for calculating the lifetime of the rolling bearing by multiplying the estimated lifetime of the rolling bearing by a correction coefficient of the rolling fatigue life depending on an increase of the surface area of the buildup portion of the indentation which is expressed by the following formula.

$$a_v = (1/n_d)^e$$

in which $a_v$ represents a correction coefficient depending on the indentation size and the number of the indentations, $n_d$ represents the rate of increase of the surface area of the buildup portion of the indentation and, e represents the Weibull slope (e=10/9 in the case of a ball bearing and e=9/8 in the case of a roller bearing).

Considering that the capacity that may be loaded increases particularly where the indentation 14 of a large size is formed in the rolling surfaces 10a and 11a or the number of the indentations 14 increases, the lifetime of the rolling bearing appears to be shortened. Accordingly, the lifetime calculation section 8a referred to above multiplies the estimated lifetime by the correction coefficient so that the capacity that is loaded may be taken into consideration. By so doing, the lifetime in accord with the capacity that is loaded can be estimated.

When the lifetime estimation unit 8 includes the lifetime calculation section 8a referred to above, the lifetime calculation section 8a may be so designed as to calculate the lifetime of the rolling bearing by multiplying the lifetime, which has been estimated on the basis of the maximum buildup height h1 of the indentation 14, by the correction coefficient referred to above. In the rolling surfaces 10a and 11a of the inner and outer rings 10 and 11 employed in the rolling bearing actually used, indentations 14 having respective buildup heights h1 of the indentation 14 are distributed. In order to take this into account, two concepts are needed in estimating the lifetime of the rolling bearing. One of those concepts is that, on the assumption that the lifetime of the rolling bearing is substantially determined by the indentation having the maximum buildup height h1, the estimated lifetime is corrected with due consideration paid to only the indentation 14 having the buildup height h1 near to the maximum value. The remaining concept is that, on the assumption that there is the probability of impairment against all of the indentations 14, the estimated lifetime is corrected with the aid of the probabilistic multiplication theorem so that all of those indentations 14 may be taken into account. Either of those concepts is effective to correct the estimated lifetime.

When the lifetime estimation unit 8 includes the lifetime calculation section 8a referred to above, the lifetime calculation section 8a may be so designed as to calculate the lifetime of the rolling bearing by estimating an individual indentation responsive lifetime for each indentation 14 on the basis of the buildup height h1 of all of the indentations 14 formed on the rolling surfaces 10a and 11a and then to calculate the lifetime of the rolling bearing and then multiplying the individual indentation responsive lifetime, which has been so estimated, by the correction coefficient referred to above.

When the buildup height estimation unit 7 determines that the buildup height h1 of the indentation 14 is smaller than 1.0 μm, the lifetime estimation unit 8 may be of a type capable of calculating the lifetime $L_n$ of the rolling bearing in which the parameter $a_d$ is equal to 1. Since no exfoliation of an indentation induced type does not occur in the case of the indentation 14 having the buildup height h1 of the indentation 14 smaller than 1.0 μm, the estimated lifetime is not affected adversely. Accordingly, when the indentation correction coefficient $a_d$ is chosen to be 1, it becomes possible to calculate the lifetime of the rolling bearing with no substantial correction efficient added.

The lifetime estimation unit 8 may include a remaining lifetime calculation section 8b for estimating the remaining lifetime of the bearing from the lifetime of the rolling bearing, which has been so estimated as described above, and the number of rotations of the bearing. In a relatively expensive rolling bearing of a large size, the desire has been arisen that the remaining lifetime can be estimated through a regular servicing inspection and the bearing be continually used in service based on the result so obtained. The remaining lifetime calculation section 8b referred to above estimates the lifetime from the dynamic equivalent load and the buildup height h1 of the indentation 14 and then the remaining lifetime from the number of rotations of the bearing unit. From the result of this estimation, it is possible to determine whether the bearing can be continually used in service or whether such bearing be replaced.

The remaining lifetime calculation section 8b referred to above may be of a type capable of determining that the remaining lifetime is zero revolution in the event of the number of rotations which exceeds the lifetime having an cumulative failure probability of lower than 10%. Since the lifetime of the rolling bearing is often based on the parameter $L_{10}$ (the number of rotations at which 90% of the rolling bearing assemblies has not yet been failed), the remaining lifetime at that time is generally assumed as the value represented by the number of rotations subtracted from the parameter $L_{10}$. If the timing, at which the remaining lifetime based on the parameter $L_{10}$ comes to represent a negative (−) value, is determined as the time of replacement of the rolling bearing, 90% of the group of the rolling bearing assemblies being checked out may be regarded as acceptably operated. In the rolling bearing assemblies, there is an application thereof in which failure of a small percentage of the rolling bearing assemblies will come to a controversial issue. In this case, it is recommended that the cumulative failure probability should be set to a value lower than 10%.

Depending on the load condition, a different value may be used for the indentation correction coefficient. In such case, the bearing service life at the time the indentation has been formed on, for example, the rolling surface can be accurately estimated in dependence on the load condition.

When the buildup height of the indentation is greater than 1.0 μm, the constants b and c employed in the formula expressive of the indentation correction coefficient may be defined in dependence on the maximum value of a contact stress of a contact surface between the rolling surface of the inner and outer rings and the rolling elements. The constants b and c are calculated using the following values when the maximum value of the contact stress is, for example, 3.0 GPa, 2.6 GPa and 2.1 GPa:

When the maximum value of the contact stress is 3.0 GPa, the constant b may be within the range of 0.10 to 0.26 and the constant c may be within the range of 1.0 to 1.3, respectively.

When the maximum value of the contact stress is 2.6 GPa, the constant b may be within the range of 0.26 to 0.42 and the constant c may be within the range of 1.3 to 1.5, respectively.

When the maximum value of the contact stress is 2.1 GPa, the constants b may be within the range of 0.42 to 0.50 and the constant c may be within the range of 1.5 to 1.7, respectively.

As the optimum values for the constants b and c, the calculation may be performed with the use of the following specific values;

When the maximum value of the contact stress is 3.0 GPa, the constant b is 0.13 and the constant c is 1.14.

When the maximum value of the contact stress is 2.6 GPa, the constant b is 0.38 and the constant c is 1.45.

When the maximum value of the contact stress is 2.1 GPa, the constant b is 0.46 and the constant c is 1.57.

The service life estimating equation other than the contact surface pressure of the above described three levels may be calculated with the use of the equation of the above described three levels by means of interpolation or extrapolation. For example, when the maximum value of the contact stress is 2.8 GPa, using the respective values of 2.60 GPa and 3.0 GPa the constant b of 0.255 and the constant c of 1.295 can be determined by means of interpolation. Also, when the maximum value of the contact stress is 1.6 GPa, using the respective value at 2.1 GPa and 2.6 GPa the constant of 0.54 and the constant of 1.69 can be determined by extrapolation value.

It is to be noted that the rolling bearing referred to above may be either a tapered roller bearing or a cylindrical roller bearing.

The present invention according to another aspect thereof provides A lifetime estimation method to estimate the service life of the rolling bearing comprising inner and outer rings, each having a respective rolling surface defined therein, and a plurality of rolling elements interposed between the respective rolling surfaces of the inner and outer rings, which method comprises: a buildup height estimation step to receive an input indicating a depth of an indentation formed in one of the rolling surfaces of the inner and outer rings, or an indentation size that represents a planar size of the indentation so as to estimate in accordance with a predetermined rule a buildup height of the indentation, as measured from the rolling surface based on the inputted depth of the indentation or the indentation size; and a lifetime estimation step to estimate the service life of the rolling bearing in accordance with a relationship between the estimated buildup height of the indentation and the rate of reduction in a rolling fatigue life, and with a dynamic equivalent load; in which the lifetime estimation step, the following formula is being used to calculate the service life $L_n$ of the rolling bearing:

$$L_n = a_d a_1 \left(\frac{C}{P}\right)^p$$

in which $a_d = c \cdot e^{(-b \times h)}$; $a_1 = \{[\ln(1-0.01n)]/\ln 0.9\}^{1/e}$; the parameter n is identical with n of the following service life $L_n$; $L_n$ represents n % service life; $a_d$ represents an indentation correction coefficient; b and c represent respective constants; h represents the buildup height (μm) of the indentation; $a_1$ and $a'_1$ each represent the reliability coefficient; P represents the load (kgf); C represents the dynamic rated load (kgf); p represents the load service life exponent (p=3 in the case of a ball bearing or p=10/3 in the case of a roller bearing), and e represents the Weibull slope (e=10/9 in the case of a ball bearing or e=9/8 in the case of a roller bearing), noting that e=1.5 when at 10% or smaller service life.

Based on test results, the buildup height h1 of the indentation 14 and the service life of the rolling bearing are assumed to have a certain relationship with each other and, in the service life estimating step, the service life of the rolling bearing is estimated from the relationship between the buildup height H1 of the indentation 14, which has been estimated during the buildup height estimating step, and the rate of reduction of the rolling fatigue life, and from the dynamic equivalent load. Also, from the result of examination, the value of the indentation correction coefficient in the equation referred to above is expressed as an function variable in dependence on, for example, the load conditions. Accordingly, the service life of the rolling bearing at the moment the indentation 14 has been formed in the rolling surfaces 10a and 11a can be accurately secured in dependence on the load condition.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 6A:
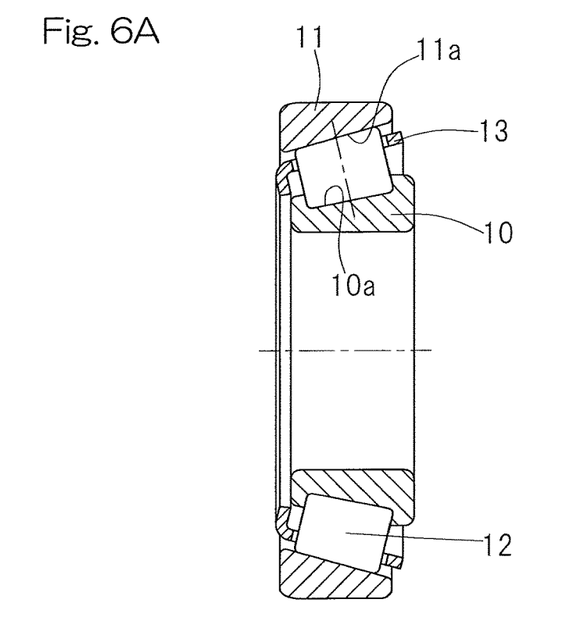
FIG. 6A is a sectional view of a tapered roller bearing, which is one of the rolling bearings.
Figure 6B:
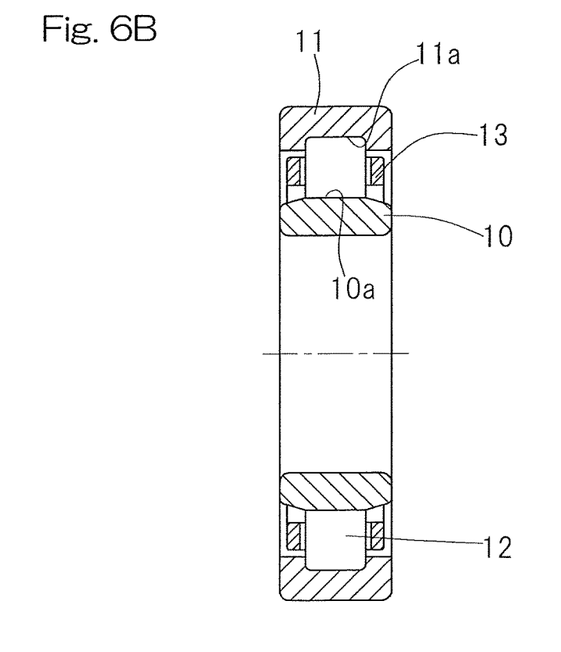
FIG. 6B is a sectional view of a cylindrical roller bearing.

A first embodiment of the present invention will now be described in detail with particular reference to FIGS. 1A and 1B to FIGS. 6A and 6B. A lifetime estimation device for a rolling bearing according to this embodiment is a device for estimating a service life or a remaining service life of, for example, a tapered roller bearing, best shown in FIG. 6A, or a cylindrical roller bearing, best shown in FIG. 6B, with the use of a computer or the like. As shown in FIGS. 6A and 6B, the rolling bearing includes inner and outer rings 10 and 11, each having a rolling surface 10a and 11a defined therein, a plurality of rolling elements 12 interposed between the respective rolling surfaces 10a and 11a of the inner and outer rings 10 and 11, and a retainer 13 for retaining the rolling elements 12. It is, however, to be noted that the rolling bearing referred to above may be either an angular contact ball bearing or a deep groove ball bearing. The description that follows is to be understood as containing the description on a lifetime estimation method for the rolling bearing assemblies.

Figure 1A:
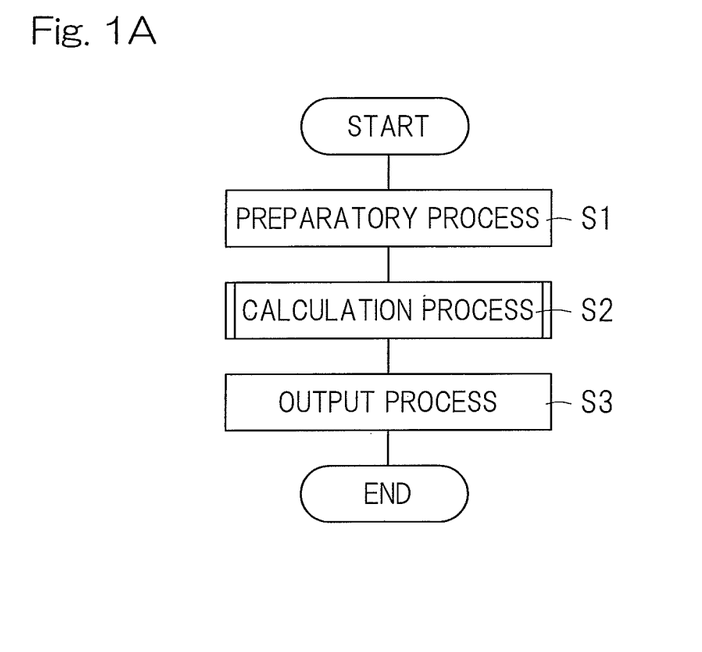
FIG. 1A is a flowchart showing a service life estimating method for a rolling bearing, which is designed in accordance with a first embodiment of the present invention.
Figure 1B:
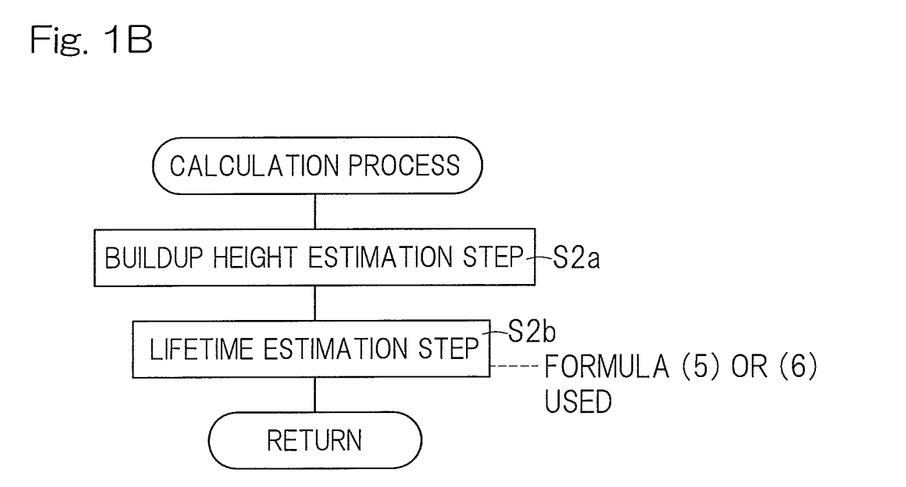
FIG. 1B is a flowchart showing a subroutine executed during a calculating process shown in FIG. 1A.

FIG. 1A illustrates a flowchart showing the sequence of steps of the life estimation method for the rolling bearing according to this embodiment. This life estimation method for the rolling bearing shown therein includes a preparatory process S1 during which various data necessary to estimate the service life are stored in a storage section as will be described later, a calculation process S2 during which the service life of the bearing is calculated with the use of values so prepared, and an output process S3 during which a result of the calculation is outputted. As shown in FIG. 1B, the calculation process S2 referred to above includes a buildup height estimation step S2a during which the buildup height as measured from the rolling surfaces is estimated from the depth of an indentation 14, which has been formed in one of the respective rolling surfaces of the inner and outer rings, or an indentation size, and a lifetime estimation step S2b of estimating the service life of the rolling bearing from a relationship between the estimated buildup height of the indentation and the rate of reduction of the rolling fatigue life, and a dynamic equivalent load.

Figure 2:
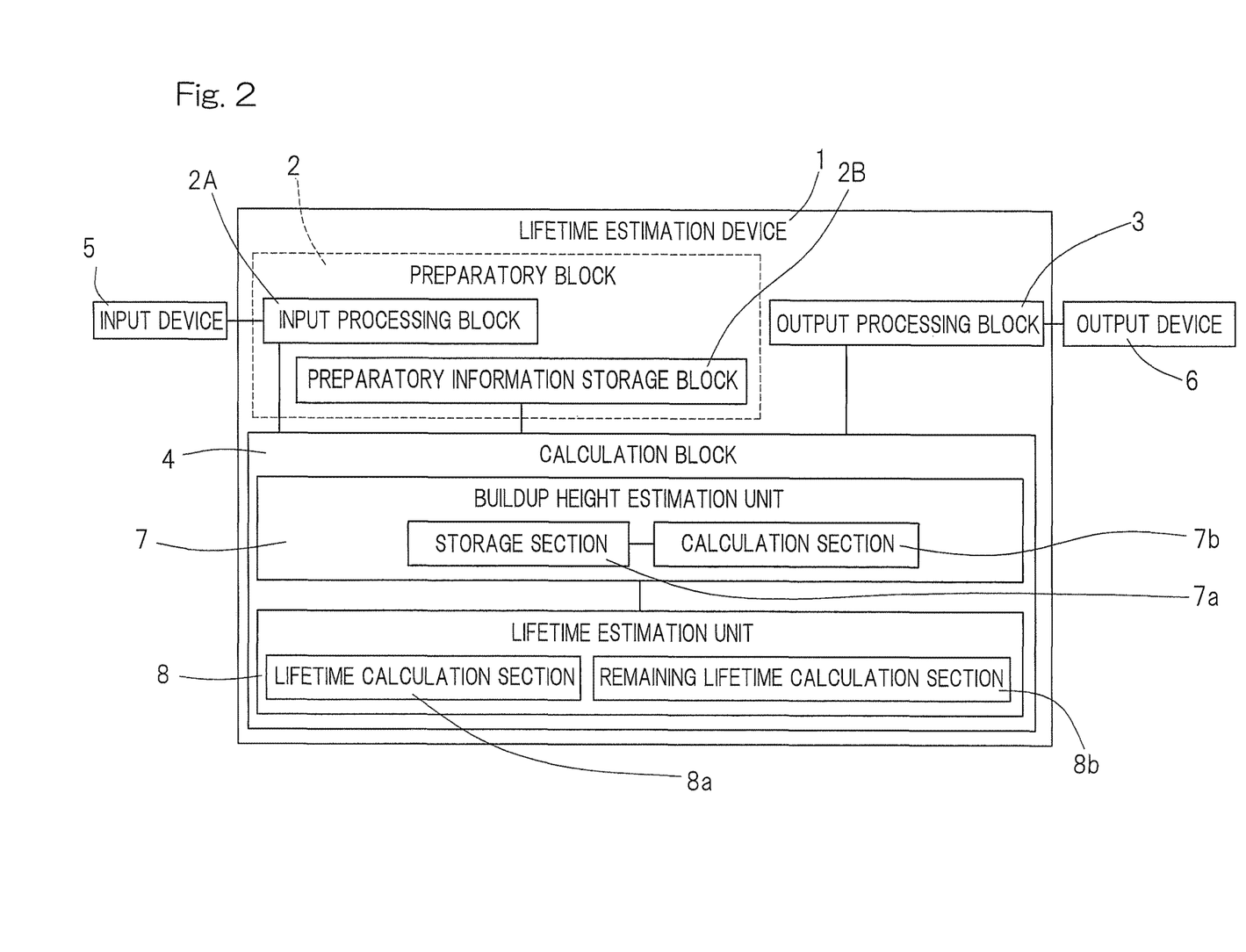
FIG. 2 is a block diagram showing a conceptual construction of a lifetime estimation device for the rolling bearing which is designed in accordance with the embodiment of the present invention.

FIG. 2 is a block diagram illustrative of a conceptual construction of the lifetime estimation device for the rolling bearing. The lifetime estimation device 1 shown therein includes a central processing unit (CPU), which is not shown, and a storage section such as, for example, a memory or the like and, by means of a hardware (including an operating system) of the lifetime estimation device 1 and a service life estimation program executed by the lifetime estimation device 1 constitute various blocks shown as schematic structures in FIG. 2, that is, an input processing block 2A of a preparatory block 2, a preparatory information storage block 2B, an output processing block 3, and a calculation block 4 are constituted. The preparatory information storage block 2B is constituted by, for example, a storage area which is a portion of the storage section equipped in the lifetime estimation device 1. The lifetime estimation device 1 is provided with an input device 5 and an output device 6. The input device 5 may be in the form of, for example, a keyboard, a pointing device, a communication equipment or a readout device for a storage element or the like. The output device 6 is comprised of a display, a printer and/or a communication equipment or the like.

The preparatory block 2 includes the input processing block 2A and the preparatory information storage block 2B. The input processing block 2A is operable of inputting various data necessary for the calculation and storing them in the preparatory information storage block 2B. Other than a function of storing the input data, as they stand, in the preparatory information storage block 2B, the input processing block 2A referred to above may have an additional or alternative function of performing a calculation of the inputted data, which is a preprocess for calculation performed by the calculation block 4, and then storing a result of such calculation in the preparatory storage section 2B.

Referring to FIG. 1A, the preparatory process S1 referred to previously is a process of storing in the preparatory information storage block 2B of FIG. 2, various pieces of information which are used in estimating the service life of the rolling bearing. Those pieces of information may include a reliability coefficient, a load, a dynamic load rating, a loaded service life index, a Weibull slope, a constant of an indentation correction coefficient and others. The preparatory block 2 shown in FIG. 2 is operable to perform the preparatory process S1 shown in FIG. 1A. The process of storing the various pieces of information in the preparatory information storage block 2B may be accomplished by inputting those pieces of information from the input device 5 or, alternatively, with respect to some of those pieces of information, after they have been determined from the inputted pieces of information by means of the calculation performed by the input processing block 2A, values so determined may be stored in the preparatory information storage block 2B.

The calculation block 4 shown in FIG. 2 is operable to perform the process of the calculation step S2 shown in FIG. 1A and includes the buildup height estimation unit 7 and the lifetime estimation unit 8. The buildup height estimation unit 7 referred to above is operable to perform the process of the buildup height estimation step S2a shown in FIG. 1B and the lifetime estimation unit 8 is operable to perform the process of the lifetime estimation step S2b. In this instance, the service life of the rolling bearing is generally expressed by the following formulas.

$$L_n = a_1 \left(\frac{C}{P}\right)^p \quad (2)$$

where $a_1 = [\ln(1-0.01n)/\ln 0.9]^{1/e}$.

$$L_n = a'_1 \cdot \left(\frac{C}{P}\right)^p \quad (3)$$

where $a'_1 = \{0.95\,[\ln(1-0.01n)/\ln 0.9]^{1/e} + 0.05\}$.

The parameter n is identical with n of the following service life $L_n$. In the formula (6) above, $L_n$ represents n % service life, $a_1$ and $a'_1$ each represent a reliability coefficient, P represents the load (kgf), C represents the dynamic rated load (kgf), p represents the load service life exponent (p=3 in the case of a ball bearing or p=10/3 in the case of a roller bearing), and e represents the Weibull slope (e=10/9 in the case of a ball bearing or e=9/8 in the case of a roller bearing), noting that e=1.5 when at 10% or smaller service life.

It will readily be seen that from the formulas (2) and (3) referred to above, the service life of the rolling bearing can be estimated from the dynamic equivalent load. It is to be noted that the formula (2) referred to above, has been utilized until the 1990s while the formula (3) referred to above is a formula which has recently been standardized and is utilized to calculate the estimated service life more accurately than that calculated by the formula (2). The dynamic equivalent load referred to previously means a certain central axial load, imposed on the bearing, or a static radial load, imposed on the bearing, whichever is of a kind capable of providing the service life similar to the service life of the bearing that is achieved under an actual loaded condition, and stands for that expressed by only a radial or axial component particularly where both of the radial load and the axial load act simultaneously on the bearing. The service life of the rolling bearing under a condition in which the foreign matter tends to admix into the bearing becomes smaller than the service life expressed by the formulas (2) and (3) by reason of the stress concentration occurring at a buildup height portion in portions of the rolling surfaces in the vicinity of the indentation. Accordingly, each of the formulas (2) and (3) need be multiplied by the indentation correction coefficient, which is used to correct the service life of the rolling bearing when the indentation is formed. The buildup height of the indentation and the service life of the rolling bearing, assuming that the both have such a relationship as expressed by an exponential function, need be corrected by multiplying the following coefficients:

$$a_d = c \cdot e^{(-b \times h)} \quad (4)$$

in which $a_d$ represents the indentation correction coefficient, b and c each represent a constant, and h represents the indentation buildup height (μm).

Here, each of the constants b and c may vary depending on the load conditions (contact pressure). In dependence on the maximum value of contact stress of contact surfaces between the rolling surfaces of the inner and outer rings and the rolling elements, that is, the contact surface pressure, the calculation is performed with the use of the following constants b and c. Also, with respect to the constants b and c, the service life calculation using the original parameter $a_d = e^{(-b \times h)}$ has been apt to result in variation between the calculated service life and the service life determined by means of experiments depending on the load conditions. Accordingly, the constant c is added. As a result, the function of $a_d = c \cdot e^{(-b \times h)}$ has been found and, according to the service life calculation performed with the function, the result matches with the service life determined by means of the experiments and, hence, the previously discussed problems has been resolved.

By way of example, when the contact surface pressure is 3.0 GPa, the parameter b will be within the range of 0.10 to 0.26 and the parameter c will be within the range of 1.0 to 1.3; when the contact surface pressure is 2.6 GPa, the parameter b will be within the range of 0.26 to 0.42 and the parameter c will be within the range of 1.3 to 1.5; and when the contact surface pressure is 2.1 GPa, the parameter b will be within the range of 0.42 to 0.50 and the parameter c will be 1.5 to 1.7.

The calculation may be performed with the use of the following values for the optimum value for each of the constants b and c.

When the contact surface pressure is 3.0 GPa, the parameter b will be 0.13 and the parameter c will be 1.14; when the contact surface pressure is 2.6 GPa, the parameter b will be 0.38 and the parameter c will be 1.45; and when the contact surface pressure is 2.1 GPa, the parameter b will be 0.46 and the parameter c will be 1.57.

It is, however, to be noted that for the indentation correction coefficient $a_d$ is set to 1 when the indentation buildup height h is equal to or smaller than 1 (h≤1).

This is so determined because the experiments have shown that when the indentation buildup height h is smaller than 1 μm, no marked reduction of the service life was observed and no damage at an indentation starting point occurred.

Figure 3:
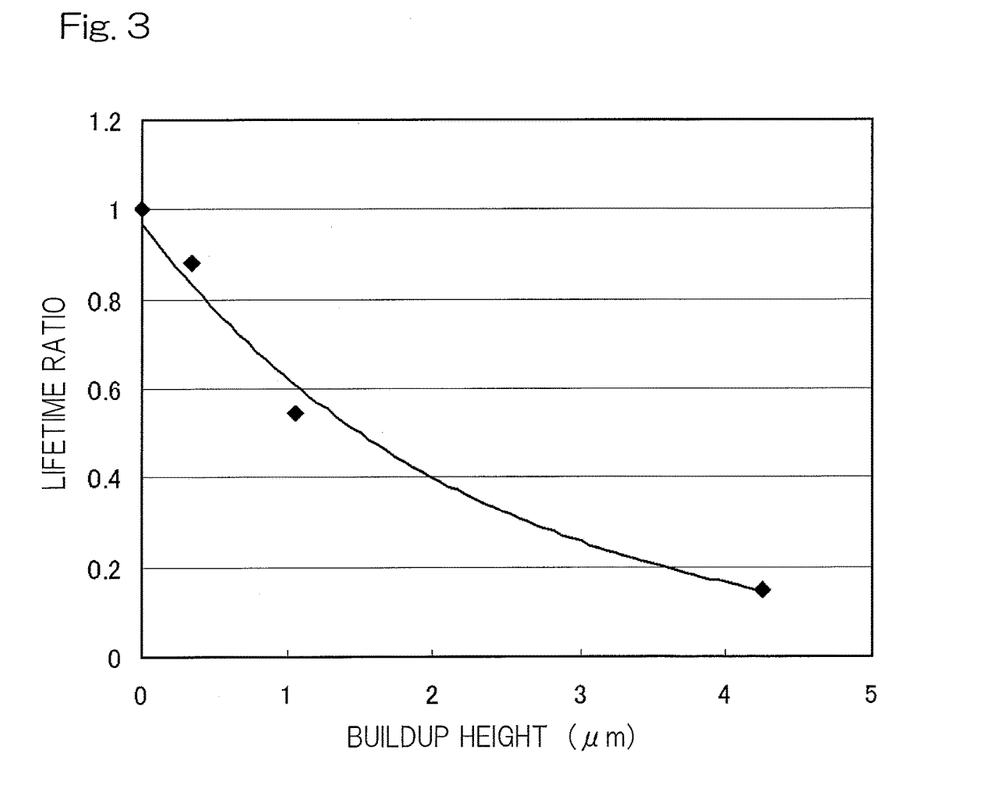
FIG. 3 is a chart showing the relationship between the buildup height of an indentation and the rate of reduction of the rolling fatigue life.

The chart shown in FIG. 3 illustrates the relationship between the buildup height h1 of the indentation, and the service life of the rolling bearing. In FIG. 3, the bearing service life of the bearing, having no buildup height portion formed on the raceway ring rolling surfaces of the bearing which results from the indentation was first determined by means of a series of experiments. Then, with respect to the bearing having such an indentation, the bearing service life that is relative to the previously described bearing service life was determined using the same test condition as that used to determine the previously described bearing service life. During the series of tests conducted, when the rolling surface of a raceway ring, which is either one of the inner and outer rings, is exfoliated, for example, when a detection value provided by a vibration sensor or the like attains a value equal to or higher than a predetermined threshold value, a computer or a test attendant worker determines that the bearing being tested has come to the end of the service life.

The test conditions referred to above are such as shown in the following Table 1.

TABLE 1

| Test Condition | |
| --- | --- |
| Bearing Tested | Tapered roller bearing |
| Dimensions (Inner dia., Outer dia., and Width) | φ 30 mm × φ 62 mm × 17.25 mm |
| Radial Load | 17.65 kN |
| Axial Load | 1.47 kN |
| Rotation Speed of Shaft | 2000 min$^{-1}$ |

From the results shown in FIG. 3, the indentation correction coefficient $a_d$ can be expressed by the function shown in the equation (4) above. It is, however, to be noted that the equation (4) referred to above is only for the purpose of illustration and the type of such function can be expressed in the form of, for example, a proportional expression, polynomial expression or the like.

As a reference suggested example, in place of the equation (4) above, the following equation may be used.

$$a_d = e^{(-b \times h)} \tag{4'}$$

in which $a_d$ represents the indentation correction coefficient, b represents a constant, and h represents the indentation buildup height (μm).

Also, as is the case with the equation (1) referred to previously, the service life of the rolling bearing when the indentation has been formed in the raceway ring rolling surface may be considered variable in dependence on the load and, therefore, can be expressed by the following formula:

$$L_{10} = L_{10c} \times 10^{(0.0038d \, \log(P/C) - 0.272 \, \log(d) + 0.416)}$$

in which $L_{10}$ represents 10% lifetime (h), $L_{10c}$ represents the calculated lifetime (h), d represents the indentation diameter (μm), P represents the load (kgf), and C represents the dynamic load rating (kgf).

From the foregoing, the service life of the rolling bearing, when the indentation 14 is formed in the rolling surfaces 10a and 11a, can be estimated from the following formulas (5) and (6), in which the formulas (2) and (3) are multiplied by the indentation correction coefficient that is expressed by the formula (4) above. Accordingly, the lifetime estimation unit can execute a process of the service life estimating step by means of the formula (5) or the formula (6).

$$L_n = a_d a_1 \left(\frac{C}{P}\right)^p \tag{5}$$

$$L_n = a_d a'_1 \left(\frac{C}{P}\right)^p \tag{6}$$

Considering that in this instance, with the indentation of a small size of not greater than 1.0 μm in buildup height of the indentation, no exfoliation of an indentation induced type did not occur in the rolling surfaces, the indentation correction coefficient expressed by the formula (4) and others need not be taken into consideration in the case of the indentation of a size having the buildup height of the indentation that is not greater than 1.0 μm. In other words, the service life of the rolling bearing is estimated with the indentation correction coefficient being taken as 1.

In the case of a bearing actually being used, it is difficult to directly measure the buildup height of the indentation at the initial stage of formation of the indentation. This is because the buildup height of the indentation tends to decrease a result of the plastic deformation taking place during the rolling. Accordingly, in estimating the service life of the bearing according to the formula (5) or the formula (6), a method of estimating the buildup height of the indentation at the initial stage, which is formed in the raceway ring of the bearing actually used, is needed.

Figure 4A:
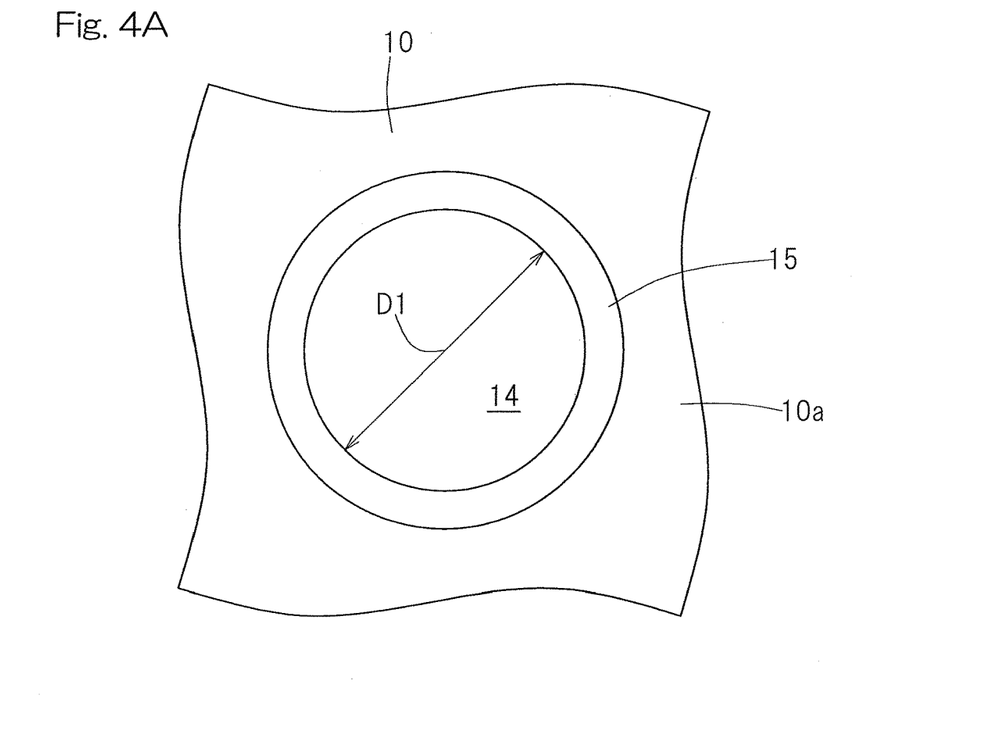
FIG. 4A is a top plan view showing, on an enlarged scale, an indentation in a raceway ring.
Figure 4B:
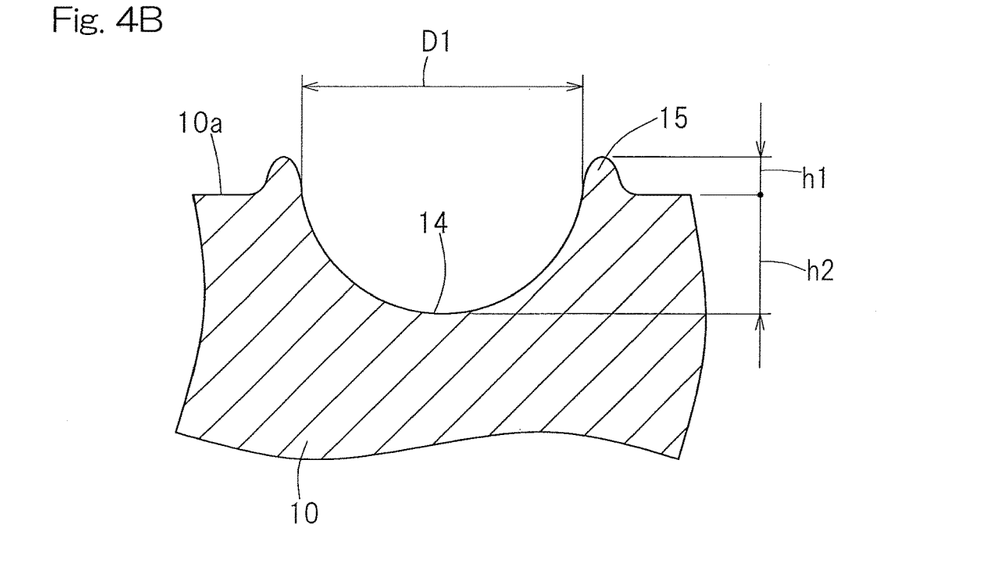
FIG. 4B is a sectional view showing a buildup height portion in the vicinity of the indentation in the raceway ring.

Here, FIG. 4A illustrates a top plan view showing, on an enlarged scale, the indentation 14 in the rolling surface 10a of the raceway ring, for example, the inner ring 10 and FIG. 4B illustrates a longitudinal sectional view showing the buildup height portion 15 in the vicinity of the indentation in the raceway ring shown in FIG. 4A. The buildup height portion 15 referred to above represents a shape of an annular projection protruding from a portion of the raceway surface 10a adjacent the indentation 14. The buildup height portion 15 has a buildup height h1 which is represented by the maximum buildup height, as measured from the rolling surface 10a, of the annular projection. The depth h2 of the indentation 14 is represented by the maximum depth position of the indentation 14 as measured from the rolling surface 10a. The indentation size is indicated by the maximum diametric dimension D1 of the indentation 14 particularly where the indentation 14, when viewed in a plane, represents a round shape.

Figure 5A:
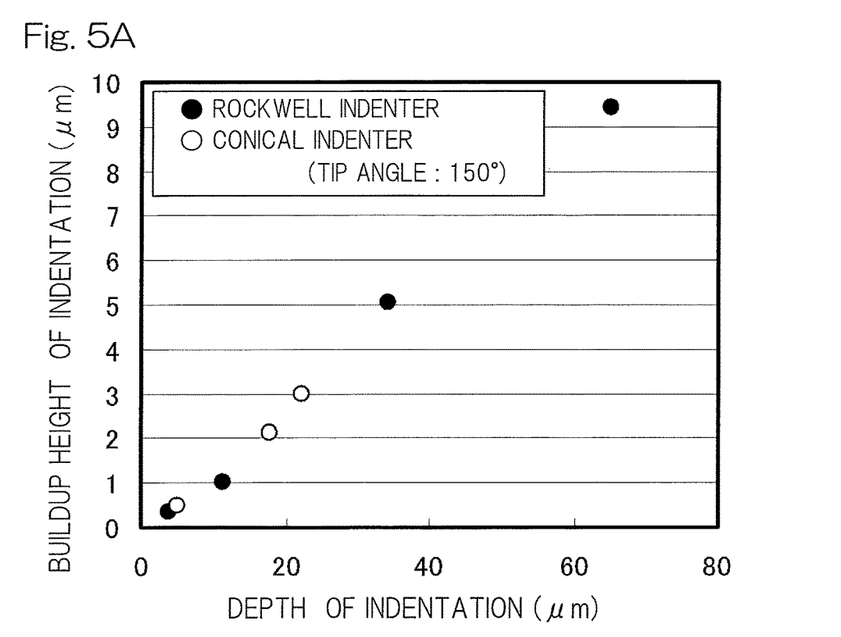
FIG. 5A is a diagram showing the relationship between the depth of the indentation and the buildup height of the indentation.
Figure 5B:
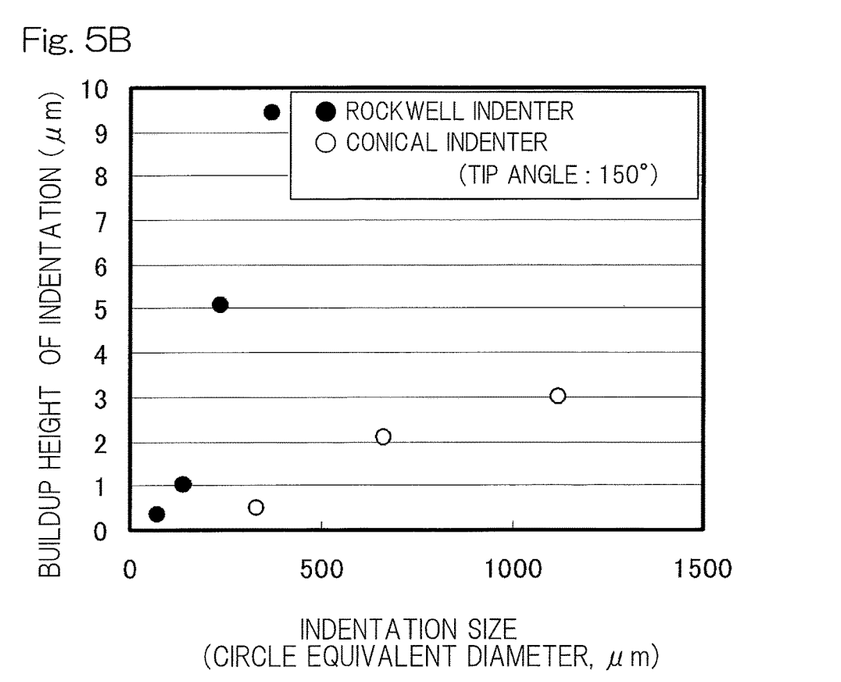
FIG. 5B is a diagram showing the relationship between the indentation size and the buildup height of the indentation.

FIGS. 5A and 5B illustrate respective results of examination conducted to determine the relationship (shown in FIG. 5A) between the buildup height of the indentation and the depth of the indentation and the relationship (shown in FIG. 5B) between the indentation size, and the buildup height of the indentation, when the indentations of different shape, that is, the indentation, in which a Rockwell indenter has been pressed, and the indentation, in which a conical indenter has been pressed are formed in the rolling surfaces of respective SUJ 2 quenched and tempered products of the raceway rings. In those charts shown respectively in FIGS. 5A and 5B, black circles indicate the buildup heights of the indentations when the Rockwell indenter used during the Rockwell tests was pressed against the respective raceway surfaces of the raceway rings, while white circles indicate the buildup heights of the indenters when the conical indenter, tapered towards an indenter tip thereof and having the indenter tip angled at 150 degrees, was pressed against the respective raceway surfaces of the raceway rings. The axis of abscissas of the chart shown in FIG. 5B represents the indentation size, which is represented by a value calculated by correcting the planar indentation size to the diametric dimension of a circle equivalent.

As shown in FIG. 5A, the buildup height of the indentation had a propensity of linearly increase with increase of the depth of the indentation and such propensity did not change in dependence on the shape of the indentation. On the other hand, the relationship between the indentation size, shown in FIG. 5B, and the buildup height of the indentation, although having shown a linear relation similar to that exhibited in FIG. 5A, was such that the indentation, formed by the Rockwell indenter pressed, and the indentation, formed by the conical indenter pressed showed different linear propensities. In other words, the relationship between the indentation size and the buildup height of the indentation varied in dependence on the shape of the indentation.

The shape of the indentation varies in dependence on the shape of the foreign matter and/or the rolling condition. Because of this, in order to estimate the buildup height of the indentation from the indentation size, relationships of the buildup height from the indentation size for each of the test conditions are necessary. In such case, the buildup height estimation unit 7 shown in FIG. 2 includes the storage section 7a for storing the relationship between the indentation size in a particular condition of use of the bearing and the buildup height of the indentation and the calculation section for calculating the buildup height of the indentation by comparing the inputted indentation size with the previously described relation stored in the storage section. The particular condition of use referred to above may include, for example, the radial load, the axial load, the rotational speed, ambient temperature, the type of a lubricant agent, and the presence or absence of a seal for sealing the lubricant agent.

It is to be noted that the storage section 7a may be replaced with the previously described preparatory information storage block 2B. If the depth of the indentation can be measured from, for example, a replica of the rolling surface, the buildup height of the indentation, a method of estimating it from the depth of the indentation is rather convenient. In such case, the buildup height estimation unit 7 includes the storage section 7a for storing the relationship between the depth of the indentation and the buildup height of the indentation and the calculation section 7b for calculating the buildup height of the indentation by comparing the measured depth of the indentation with the relationship stored in the storage section 7a.

From the foregoing, the buildup height estimation unit 7 in the calculation block 4 calculates the buildup height of the indentation by referring to the relationship stored in the storage section 7a (or the preparatory information storage block 2B) and shown in FIG. 5A or FIG. 5B. When the buildup height is calculated as a value not greater than 1.0 μm, the lifetime estimation unit 8 calculates the service life $L_n$ of the rolling bearing according to the formula (5) or the formula (6), setting the indentation correction coefficient $a_d$=1 expressed in the formula (4) or others. When the buildup height is calculated as a value greater than 1.0 μm by the buildup height estimation unit 7, the lifetime estimation unit 8 calculates the service life $L_n$ of the rolling bearing according to the formula (5) or the formula (6) on the basis of the indentation correction coefficient obtained by substituting the indentation buildup height into the formula (4). In this process, different values may be used for the indentation correction coefficient depending on load conditions. In this way, the service life of the rolling bearing, when the indentation is formed in the raceway ring rolling surfaces, can be estimated from the estimated value of the buildup height of the indentation with the use of the formula (5) or (6).

The service life of the rolling bearing that can be estimated by the previously described method is represented by the value applicable where only one indentation is formed in the rolling surfaces. Where a large indentation is formed in the rolling surfaces or the number of the indentation increases, it appears that the service life of the rolling bearing is shortened because of an increase of the capacity that receives a load. In view of this, in order to take into consideration the capacity that receives the load, the estimated service life is corrected according to the following formula (7).

$$a_v = (1/n_d)^e \quad (7)$$

in which $a_v$ represents a correction coefficient necessitated by the indentation size and the number of indentations, $n_d$ represents the rate of increase of the surface area of the indentation buildup portion, and e represents the Weibull slope (e=10/9 in the case of the ball bearing and e=9/8 in the case of the roller bearing).

The foregoing formula (7) is illustrative of the correction of the estimated service life based on the Weibull theory according to which the service life decreases with an increase of the loaded volume onto the rolling surfaces. Where the indentation exists in a plural number or the indentations of different sizes are formed, the lifetime estimation unit 8 includes the lifetime calculation section 8a for calculating the service life $L_n$ of the rolling bearing by multiplying the formula (5) or the formula (6) by the correction coefficient according to the formula (7) above.

In the rolling surfaces of the rolling bearing actually used, indentations of different buildup heights of the indentation are distributed. In order to take this into consideration, two concepts are needed in estimating the service life of the rolling bearing. One of those concepts is that, on the assumption that the service life of the rolling bearing is substantially determined by the indentation having the maximum buildup height, the estimated service life is corrected with due consideration paid to only the indentation having the buildup height near to the maximum value. The other concept is that, on the assumption that there is the probability of impairment against all of the indentations, the estimated service life is corrected with the aid of the probabilistic multiplication theorem so that all of those indentations may be taken into account. Either of those concepts is effective to correct the estimated service life.

If the service life of the rolling bearing is determined by the indentation having the maximum buildup height, the service life estimating calculation section 8a calculates the service life $L_n$ of the rolling bearing by multiplying the service life, estimated on the basis of the maximum buildup height of the indentation, by the correction coefficient expressed by the formula (7) referred to above. In other words, it is acceptable to determine the service life $L_n$ of the rolling bearing by measuring the number of and the surface area of the indentation having a buildup height close to the maximum of the indentations and multiplying the formula (5) or the formula (6) by a correction coefficient of the formula (7) referred to above.

Where the bearing service life is to be determined in consideration with all of the indentations, the lifetime calculation section 8a corrects the estimated service life by measuring the service life according to the formula (5) or the formula (6) for each of the buildup heights of the indentations and substituting the service life, which is multiplied by the correction coefficient of the formula (7), in which influences of the number of indentations are taken into considered, into the following formula (8).

$$\left(\frac{1}{L}\right)^e = \sum_{i=1}^{I}\left(\frac{1}{L_i}\right)^e \quad (8)$$

in which L represents the service life with all of the indentations taken into consideration, $L_i$ represents the service life corresponding to the sum of the service lifes of the indentations of the individual size to which the correction resulting from the number of the indentations is added, and e represents the Weibull slope (e=10/9 in the case of the ball bearing and e=9/8 in the case of the roller bearing).

It may occur that in the case of the rolling bearing actually used, it is difficult in view of the structure of the bearing to prepare respective replicas of the rolling surfaces and, therefore, the depth of the indentation cannot be measured. In such case, it is necessary to estimate the buildup height by preparing database of indentation sizes and buildup heights of indentations under particular conditions of use, observing the rolling surfaces of the bearing with the aid of a fiber scope and checking the indentation size of the observed rolling surfaces against the database.

Figure 7:
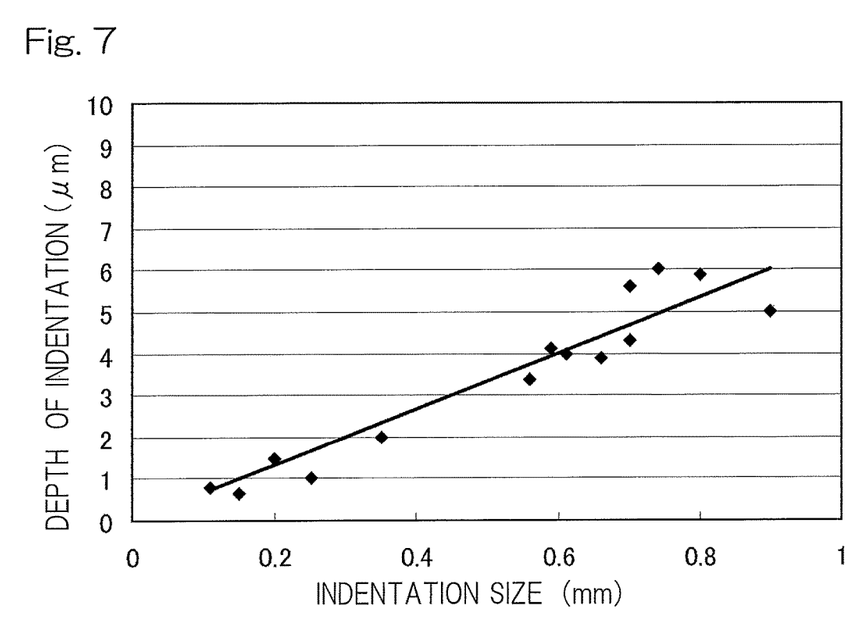
FIG. 7 is a diagram showing the relationship between the indentation size and the depth of the indentation.

The chart shown in FIG. 7 illustrate a result of examination conducted to determine the relation between the indentation size and the depth of the indentation in each of three bearing assemblies used under the same usage conditions. The axis of abscissas of the chart of FIG. 7 represents values of planar size of the indentations which have been corrected into a diametric dimension of circle equivalents. As shown therein, although the number of the indentations in those three bearing assemblies differed from each other, a substantially linear relationship was found in the relationship between the indentation size and the buildup height of the indentation. The database referred to previously is rewritably accommodated in the storage section 7a or the preparatory information storage block 2B. Accordingly, with no need to prepare the replicas of the rolling surfaces, the buildup height estimation unit 7 can estimate the buildup height easily by comparing the indentation sizes of the observed rolling surfaces with the database.

The method of estimating the remaining service life of the rolling bearing then in service with the use of the previously discussed lifetime estimation method of the bearing will now be described. In the case of the relatively expensive rolling bearing of the large size, desires have been arisen to continue the use of the bearing in reference to the result of estimation of the remaining service life made through regular inspections. The lifetime estimation unit 8 referred to above may include the remaining lifetime calculation section 8b for estimating the remaining service life of the bearing from the estimated service life of the rolling bearing and the number of rotations of the bearing. In other words, the remaining lifetime calculation section 8b estimates the service life from the dynamic equivalent load and the buildup height of the indentation and estimates the remaining service life from the number of rotations of the bearing. Since the service life of the rolling bearing in most cases make use of $L_{10}$ (the number of rotations at which 90% of the rolling bearing assemblies do not fracture) as the standard, the difference between the $L_{10}$ and the number of rotations is typically employed as the remaining service life at that time. In the event that the timing, at which the remaining service life based on the parameter $L_{10}$ comes to represent a negative (−) value, is determined as the time of replacement of the rolling bearing, 90% of the group of the rolling bearing assemblies being checked out may be regarded as acceptably operated. In the rolling bearing assemblies, there is an application thereof in which failure of a small percentage of the rolling bearing assemblies will come to a controversial issue. In this case, the cumulative failure probability may be set to a value lower than 10%.

Since no formation of the indentation in the raceway ring rolling surfaces at the start of use of the bearing, with the indentation correction coefficient $a_d$ set to 1, the operation has to be continued until the remaining service life becomes a negative (−) value or until the next succeeding inspection. If the indentation is found having been formed in the rolling surface at the time of inspection, the service life is estimated with the use of the indentation correction coefficient $a_d$, determined from the buildup height of the estimated indentation, to thereby determine the remaining service life. Since at this time it is not apparent what stage the replica or the indentation, observed with the use of, for example, a fiber scope, has been formed, it is not possible to set the accurate number of rotations. If it is an idea for the security to replace the bearing as soon as possible before it fractures, the number of rotations is employed in the form of the total number of rotations. If the remaining service life calculated on the assumption of the situation in which the indentation has been formed does not become a negative (−) value, the operation is continued until the remaining service life becomes the negative (−) value or by the time the next succeeding inspection takes place.

If the operation of the bearing continues by the time the next succeeding inspection takes place, an examination of the indentation shape takes place with the use of, for example, a replica or a fiber scope and others. Where the distribution of the indentations 14 are identical with that during the first examination, the service life is estimated with the use of the indentation correction coefficient $a_d$ determined during the previous inspection to thereby determine the remaining service life. Thereafter, the value of the indentation correction coefficient $a_d$ is estimated in reference to a newly formed indentation to thereby determine the remaining service life. Should either of those remaining service lifes not become a negative (−) value, the operation is continued until the remaining service life becomes the negative (−) value or until the time the next succeeding inspection takes place. The procedures of estimating the remaining service life subsequent to the second inspection becomes similar to the procedure that has been described above.

Although the above described remaining service life estimation has been described as being carried out when the load imposed on the bearing is constant, the remaining service life is estimated using a linear accumulated failure rule, expressed by the following formula (9), if the load changes for each of the numbers of rotations.

$$\sum_{i=1}^{I} \frac{n_i}{L_i} = 1 \quad (9)$$

in which I represents the number of steps of the load standard, $L_i$ represents the service life at the load level expressed by i, and $n_i$ represents the number of loads or the number of rotations at the load level expressed by i. If this formula is used, the timing at which the rolling bearing is when the sum of $n_i/L_i$ attains 1.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein. Herein, the computer-readable recording medium is any non-transitory data storage device that can store data which can be thereafter read by a computer. Examples of computer-readable recording media include read-only memory (ROM), random-access memory (RAM), CD-ROMs, magnetic tapes, floppy disks and optical data storage devices.

REFERENCE NUMERALS

1 . . . Lifetime estimation device
7 . . . Buildup height estimation unit
7a . . . Storage section
7b . . . Calculation section
8 . . . Lifetime estimation unit
8a . . . Lifetime calculation section
8b . . . Remaining lifetime calculation section
10 . . . Inner ring
11 . . . Outer ring
10a, 11a . . . Rolling surface
12 . . . Rolling element
14 . . . Indentation

What is claimed is:

1. A non-transitory computer readable medium storing a lifetime estimation computer program product causing a computer to estimate a service life of a rolling bearing in order to determine whether to reuse or remove from service the rolling bearing, the rolling bearing comprising inner and outer rings, each ring having a rolling surface defined therein, and a plurality of rolling elements rollingly interposed between the respective rolling surfaces of the inner and outer rings, the lifetime estimation computer program product comprising:

a buildup height estimation unit to receive an input indicating a depth of an indentation formed in one of the rolling surfaces of the inner and outer rings, or an indentation size that represents a planar size of the indentation so as to estimate in accordance with a predetermined rule a buildup height of the indentation as measured from the rolling surface based on the inputted depth of the indentation or the indentation size; and a lifetime estimation unit to estimate the service life of the rolling bearing in accordance with a rule determined by a relationship between the estimated buildup height of the indentation and the rate of reduction in a rolling fatigue life and a dynamic equivalent load;

wherein the lifetime estimation unit calculates the service life $L_n$ of the rolling bearing to determine whether to reuse the rolling bearing or to remove the rolling bearings from service $$L_n = a_d a \left(\frac{C}{P}\right)^p,$$

according to equation where $a_d = c \cdot e^{(-b \times h)}$;

$a = a_1 = \{[\ln(1-0.01n)]/\ln 0.9\}^{1/e}$ or $a = a'_1 = \{0.95 \ [\ln(1-0.01n)/\ln 0.9]^{1/e} + 0.05)$;

the parameter n is identical with n of the following service life $L_n$;

$L_n$ represents n % service life;

$a_d$ represents an indentation correction coefficient;

b and c represent respective constants;

h represents the buildup height (μm) of the indentation;

$a_1$ and $a'_1$ each represent the reliability coefficient;

P represents the load (kgf);

C represents the dynamic rated load (kgf); p represents the load service life exponent, where p=3 in the case of a ball bearing or p=10/3 in the case of a roller bearing; and e represents the Weibull slope, where e=10/9 in the case of a ball bearing or e=9/8 in the case of a roller bearing, and e=1.5 when at 10% or less service life.

2. The non-transitory computer readable medium as claimed in claim 1, wherein the buildup height estimation unit comprises:

a storage section to store a relationship between the indentation size and the buildup height of the indentation under particular conditions of use of the bearing; and a calculation section to calculate the buildup height of the indentation by comparing the inputted buildup size with the relationship stored in the storage section.

3. The non-transitory computer readable medium as claimed in claim 1, wherein the lifetime estimation unit comprises: a lifetime calculation section to calculate the service life of the rolling bearing by multiplying the estimated service life of the rolling bearing by a correction coefficient of the rolling fatigue life depending on an increase of the surface area of the buildup portion of the indentation which is expressed by formula $a_v = (1/n_d)^e$, where $a_v$ represents a correction coefficient depending on the indentation size and the number of the indentations, $n_d$ represents the rate of increase of the surface area of the buildup portion of the indentation, and e represents the Weibull slope, where e=10/9 in the case of a ball bearing and e=9/8 in the case of a roller bearing.

4. The non-transitory computer readable medium as claimed in claim 3, wherein the lifetime calculation section calculates the service life of the rolling bearing by multiplying the service life, estimated based on the maximum buildup height of the indentation, by the correction coefficient.

5. The non-transitory computer readable medium as claimed in claim 3, wherein the lifetime calculation section calculates the service life of the rolling bearing by estimating an individual indentation responsive service life for each indentation on the basis of the buildup height of all of the indentations formed on the rolling surfaces and then by multiplying the individual indentation responsive service life, which has been so estimated, by the correction coefficient.

6. The non-transitory computer readable medium as claimed in claim 1, wherein the lifetime estimation unit, when the buildup height estimation unit estimates that the buildup height of the indentation is 1.0 μm or smaller, calculates the service life $L_n$ of the rolling bearing with the indentation correction coefficient set to $a_d=1$.

7. The non-transitory computer readable medium as claimed in claim 1, wherein the lifetime estimation unit comprises a remaining lifetime calculation section to estimate a remaining service life of the bearing from the service life of the rolling bearing, which has been so estimated, and the number of rotations of the bearing.

8. The non-transitory computer readable medium as claimed in claim 7, wherein the remaining lifetime calculation section determines that the remaining service life is zero revolution in the event of the number of rotations which exceeds the service life having a cumulative failure probability of lower than 10% or lower.

9. The non-transitory computer readable medium as claimed in claim 1, wherein a different value is used for the indentation correction coefficient in dependence on a load condition.

10. The non-transitory computer readable medium as claimed in claim 9, wherein when the buildup height of the indentation is greater than 1.0 μm, the constants b and c employed in the indentation correction coefficient are defined in dependence on a maximum value of a contact stress of a contact surface between the rolling surface of the inner and outer rings and the rolling elements.

11. The non-transitory computer readable medium as claimed in claim 1, wherein the rolling bearing is a tapered roller bearing or a cylindrical roller bearing.

* * * * *

UNITED STATES PATENT AND TRADEMARK OFFICE
CERTIFICATE OF CORRECTION

PATENT NO. : 10,436,674 B2
APPLICATION NO. : 14/413831
DATED : October 8, 2019
INVENTOR(S) : Takashi Ito et al.

It is certified that error appears in the above-identified patent and that said Letters Patent is hereby corrected as shown below:

In the Claims

Column 19, Line 24 (approx.), Claim 1, delete "+0.05);" and insert -- +0.05}; --, therefor.

Signed and Sealed this
Twenty-fourth Day of December, 2019

Andrei Iancu
*Director of the United States Patent and Trademark Office*